United States Patent [19]

Kusay

[11] 3,998,738
[45] Dec. 21, 1976

[54] VACUUM DRYING AND DEGASSING

[75] Inventor: Roland Gregor Paul Kusay, Blechingley, England

[73] Assignee: BOC Limited, London, England

[22] Filed: Jan. 31, 1975

[21] Appl. No.: 546,073

Related U.S. Application Data

[63] Continuation-in-part of Ser. No. 417,560, Nov. 20, 1973, abandoned.

[30] Foreign Application Priority Data

Nov. 22, 1972 United Kingdom ............. 53956/72

[52] U.S. Cl. .................................. 210/180; 55/208; 134/111; 196/46.1; 210/185; 210/406; 219/275; 219/381
[51] Int. Cl.² ......................................... B01D 35/18
[58] Field of Search ............. 219/381, 275; 55/208; 23/272.6 R; 134/10, 110, 111; 196/46.1; 210/71, 150, 151, 180, 181, 182, 184, 185, 188, 406, 436, 446, 454, 472, 474, 497; 261/94, 95, 98

[56] References Cited

UNITED STATES PATENTS

| 2,174,265 | 9/1939 | Holt | 196/46.1 |
| 2,834,466 | 5/1958 | Hament | 210/188 |
| 3,249,438 | 5/1966 | Topol | 196/46.1 |
| 3,578,416 | 5/1971 | Pope | 219/381 |
| 3,686,474 | 8/1972 | Power | 219/275 |
| 3,688,083 | 8/1972 | Rice et al. | 219/275 |
| 3,781,518 | 12/1973 | Power et al. | 219/275 |
| 3,943,330 | 3/1976 | Pollock et al. | 219/381 |

Primary Examiner—Thomas G. Wyse
Assistant Examiner—R. G. Mukai
Attorney, Agent, or Firm—Dennison, Dennison, Meserole & Pollack

[57] ABSTRACT

A heat-sensitive liquid is dried and purified, by the degassing of sorbed gases, by means of a permeable electric heater, through which the liquid is passed, the liquid flowing first through a permeable liner presenting a flow impedance such that the degassing of the water vapour and gaseous impurities becomes significant only after the liquid has entered the body of the heater element.

17 Claims, 3 Drawing Figures

VACUUM DRYING AND DEGASSING

This application is a continuation-in-part of application Ser. No. 417,560, filed Nov. 20, 1973, now abandoned.

SUMMARY OF THE INVENTION

Complex organic liquids, such as electrical insulation oils for transformers and like high voltage electrical apparatus, frequently contain as contaminants both water and sorbed gases. These contaminants degrade the oil to an extent which varies with their concentration. Because the concentration usually increases with time, as the oil resides continually in the apparatus, there comes a time when the oil needs to be treated to have the contaminants removed or at least reduced.

Removal of water from oil is known as drying the oil. The drying and degassing of liquids can pose exacting technical problems.

Release of sorbed gas (sorbate) and water from a liquid can be effected or facilitated by raising the temperature of the liquid, but only a moderate rise in temperature can be permitted in the case of some heat-sensitive liquids, such as transformer oils. In addition, this temperature rise must be uniform throughout the liquid, because if any part of the liquid reaches a temperature where thermal degradation occurs, the whole of the liquid may be rendered useless for its intended purpose.

The use of vacuum in association with heating a liquid makes drying and degassing more efficient at a safe temperature rise, but the liquid must be heated very carefully to ensure that too-steep temperature gradients, with local excessive increases in temperature, cannot possibly occur.

The present invention depends on the realisation that a heater which is particularly well suited for use in a vacuum drying and degassing apparatus for temperature-sensitive liquids is a permeable element heater. It is characteristic of a permeable element heater that a very high internal surface area of heated material is presented to the liquid being treated as it flows through the element structure. It is also characteristic that the interstices of the element structure are of very small dimensions, so that no part of the liquid flowing through the element is very far from a heated surface. Thus flow through the heater is, from the heat transfer point of view, analogous to flow of a very thin film of liquid over a very extensive heated surface. These are conditions in which the liquid can be rapidly and efficiently heated, with there being a very small temperature difference between the heater surface and the liquid, and with very shallow temperature gradients through the liquid. A further advantage of a permeable element device is the short distance the liquid has to travel through the heater in being raised to its desired temperature, so that the period during which the liquid is heated is much shorter than with known electric heaters. The danger of thermal degradation of the liquid being heated is thus reduced by the absence of large temperature differences, steep temperature gradients, or long periods in contact with heated surfaces.

A typical permeable element heater is disclosed in U.S. Pat. No. 3,688,083 (Rice et al.). It comprises a hollow cylindrical heating element of permeable, electroconductive, material. The element is heated by passing electric current between terminals affixed to its ends, so as to release Joule heat within the element. The liquid to be heated is normally supplied under pressure to one face of the element and flows (permeates) to the other surface of the element. As it does so it has heat transferred to it from the heated element. The amount of heat can be such that the liquid issues from the element as a vapour, but in putting the present invention into practice, the amount of heat is carefully controlled for the reasons already discussed.

At high levels of contamination, the evolution of degassed sorbate or water vapour is so violent that the oil emerging from the exit face of the heater is atomized, thereby increasing the degassing effect. To enhance the drying and degassing of the liquid, the external surface of the permeable element heater is subjected to a pressure significantly below atmospheric. As oil is supplied to the interior of the heater under pressure, this means that a significant pressure gradient is applied across the liquid during the heating process. The permeability of the heater element itself is very high, i.e., its flow impedance is very low. This means that only a moderate pressure drop is required to induce the required rate of liquid flow through the element. The situation is thus very likely to arise that the liquid feed arriving at the entry face of the heater element is at a pressure substantially below atmospheric. Since the liquid feed normally contains water and sorbed gas, there is a real danger that, unless preventive measures are taken, the water and gas will come out of solution in significant quantities, in the form of bubbles of gas and water vapour, before the liquid feed enters the permeable element itself. Since Joule heat is generated uniformly throughout the permeable element, and since the transfer of heat to liquid in its gaseous phase is much less effective than in its liquid phase, local overheating of the element could occur where gas or vapor bubbles blanket parts of the entry face of the element, the liquid flow being displaced to other parts of the entry face not so blanketed. Such local 'hot spots' could involve a serious risk of thermal damage to the liquid, and could render impossible the use of a permeable element heater for the purposes under discussion.

Avoidance of problems such as those discussed above requires, in addition to an electrically and structurally uniform element, a uniform liquid feed into the entry face of the element, with the generation of gas and vapour bubbles being restrained until the liquid has begun its passage through the element. In a drying and degassing apparatus according to the present invention, the desired conditions are obtained by providing a non-electrically conducting liner against the entry surface of the element, the liner being uniformly permeable but having a permeability so much less than that of the element that the pressure drop across the liner is high compared with that across the element. In addition, when the desired flow conditions are reached, the liquid feed at the entry face of the liner is maintained at a pressure high enough to inhibit the formation of gas and vapour bubbles until, at the most, shortly before the liquid enters the element.

The liquid feed to the combined element and liner can be at such a high rate that a substantially uniform liquid flow into the combined structure is assured in spite of differences of manometric head within the structure. The evolution of bubbles of vapor and gas is suppressed until after the liquid has entered the body of the element. Vapor or gas bubbles formed within the element or liner cannot grow backwards, i.e., against the direction of flow of the liquid, and reenter the liner, or emerge at its entry face, but must accelerate in the direction of flow to escape from the element as their volume increases, and be replaced rapidly by fresh liquid flowing into the combined structure.

Permeable electric heater devices including liners of the type discussed above, have been described in U.S. Pat. No. 3,781,518, issued Dec. 25, 1973, in connection with boilers for vapor vacuum pumps. The use of liners in apparatus of the present invention is on a basis different in kind from such previously described cases.

In permeable element boilers (or vaporizers) for vapor vacuum pumps, the main body of liquid is vaporized in passing through the boiler. The liner is provided primarily to control flow irregularities due to the generation of vapor bubbles in the main liquid while it is being heated.

In drying and degassing applications the liquid feed may be grossly contaminated with sorbed gas and dissolved or emulsified water, and very large 'pockets' of degassed sorbate and water vapor may appear on the inlet face of the permeable element heater, at which stage the liquid being treated has not yet been heated at all. The present invention is based on the realization that a liner could be used to control this phenomenon. The use of a permeable element heater provided with a less- permeable liner on its entry face, in association with a vacuum drying and degassing apparatus of the type described, provides a structure which has unique performance characteristics for the work for which it is intended.

Accordingly the present invention has as one of its objects to provide vacuum drying and degassing apparatus for contaminated liquids, in which apparatus the evolution of bubbles of degassed sorbate and water vapour is inhibited until after the gas has entered the body of a permeable electric heater element.

The present invention will now be described by way of example with reference to the accompanying drawings, in which.

Figure 1:
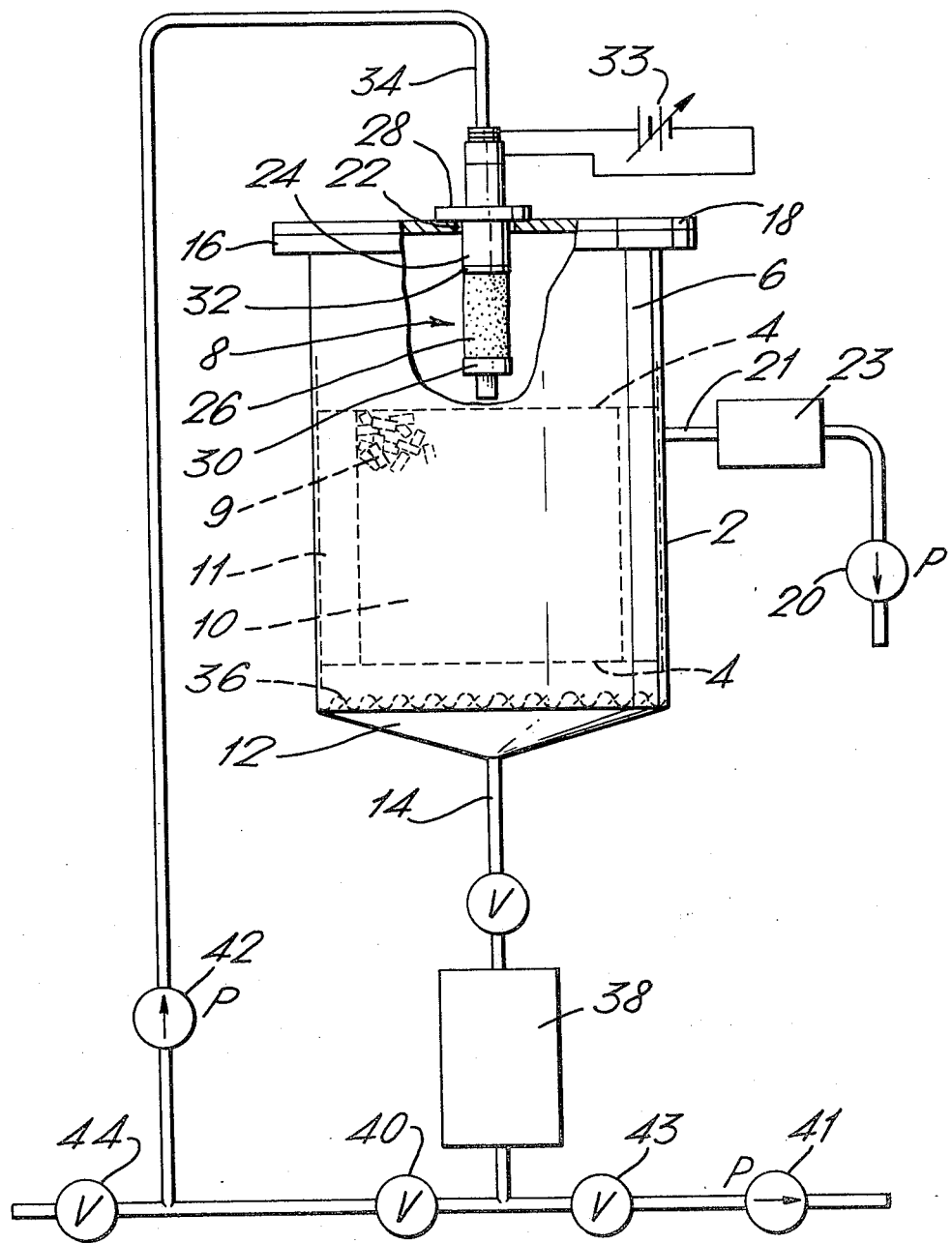
FIG. 1 is a diagrammatic, cross-sectional, view of one form of a single-stage drying and degassing apparatus of the present invention.

The single-stage vacuum drying and outgassing apparatus shown in FIG. 1 includes a container 2 having in it four chambers delineated by perforated partitions 4 through which the oil or other liquid being treated can flow. In the upper chamber 6 is positioned a permeable electric heater indicated generally by reference 8. The middle chamber 10 is generally cylindrical and is packed with Raschig rings 9 or other packed column fillers. Each Raschig ring is a hollow open cylinder of diameter equal to its length, and the rings are randomly packed so as to provide a chemically inert surface of large area over which the liquid to be treated can flow turbulently in thin films so that constantly renewed film surfaces are exposed to the reduced pressure atmosphere in the interior of container 2. The middle chamber 10 is surrounded by an annular chamber 11 which is in communication, through conduit 21, with a condenser 23 connected to the inlet of a vacuum pump 20 which is adapted to exhaust to atmosphere.

The bottom chamber 12 in container 2 is adapted to receive all the liquid which has passed through chamber 10, and lead it towards an outlet conduit 14 which extends to a reservoir 38.

Figure 2:
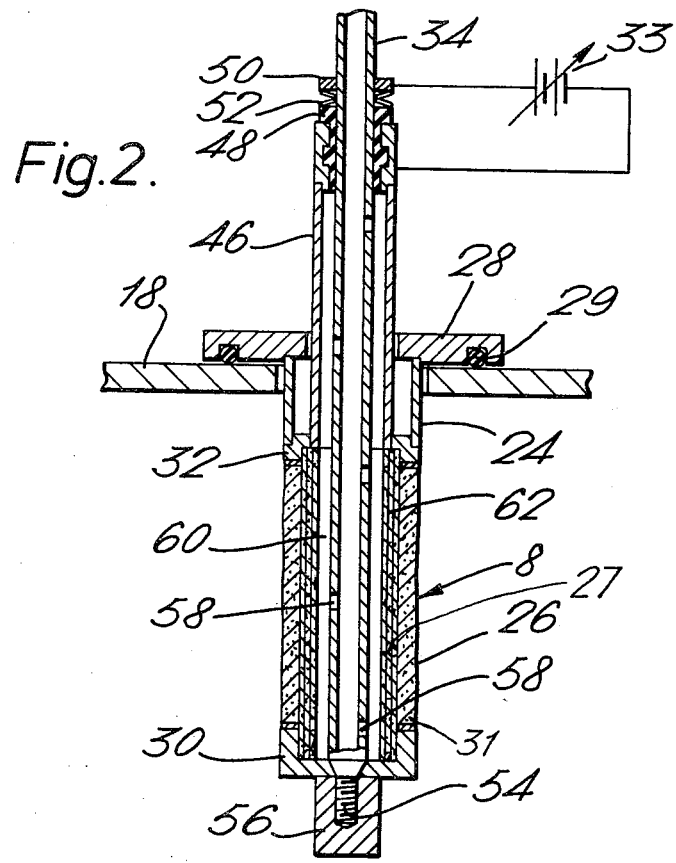
FIG. 2 is a cross-sectional view of a permeable electric heater element for use in the invention, but drawn to a larger scale than on FIG. 1.

The mouth of container 2 is bounded by a flange 16 to which is secured a cover plate 18, the connection between the two being fluid-tight. The cover plate 18 has in it an aperture 22 through which passes a cylindrical support 24 and other components of the permeable electric heater 8. The actual construction of the heater is as shown in FIG. 2.

The support 24 at its upper end is secured to a flange 28 which is bolted or otherwise secured to cover plate 18, an O-ring seal 29 being provided to make the connection vacuum-tight.

The contaminated oil to be treated is able to enter the apparatus through a valve 44, th oil being pumped by pump 42 to conduit 34 leading to the interior of the heater 8.

The outlet of reservoir 38 leads through a valve 40 to the connection between valve 44 and pump 42. Keeping valve 44 closed and pump 42 energized would cause the treated oil in reservoir 38 to be recirculated through the drying and degassing equipment. A pump 41 is connected to the outlet of reservoir 38 through a valve 43 to enable the treated oil to be discharged continuously at atmospheric pressure into the electrical or other apparatus from which it is being withdrawn.

The condenser 23 is cooled either by the ambient atmosphere or by means of an additional coolant, such as water. This is to condense those light fractions of the contaminated oil which are vaporized both on passing through the heater and while flowing over the packed column fillers 9 while the interior of chamber 10 is kept at a pressure well below atmospheric and close to the saturation vapor pressure of the oil. The condensate, of preferably between 2.5% of the total oil flow, from the condenser 23 is fed to lower section 12 of chamber 2 to ensure that both the chemical and physical properties of the degassed oil are maintained. The degassed sorbate and air are removed by pump 20.

The structure of the heater 8 is shown in more detail in FIG. 2. It comprises basically an annular cylinder 26 of a permeable, electroconductive, material such as carbon or barium titanate extending between two metal terminals 30 and 32. In order to increase the surface area of contact between the terminals and the heater body 26, the contact faces of the terminals are serrated, knurled, or otherwise roughened. In addition, the serrated surfaces are preferably plated with a non-oxidizable metal, such as a noble metal. This is because it is normally convenient to make the terminals 30 and 32 of copper, but it has been found that bare copper surfaces would oxidise fairly readily under the conditions obtaining in the degassing equipment in operation. This would lead to the production of non-conductive films which, at the high heating currents employed in the permeable electric element, could lead to such high temperatures at the contact faces with the terminals that the ends of the cylinder 26 could become damaged or blocked by thermally degraded oil.

The upper terminal 32 is mechanically supported from flange 28 by means of a thin-walled cylinder 24 of stainless steel or like metal having low thermal conductivity. The terminal 32 in turn supports a contact tube 46 which extends externally of flange 28 and which ends in an insulator 48 positioned between it and the coaxial inlet tube 34 of heater 8. A fluid-tight seal, usually in the form of an O-ring, is provided between the two tubes in this region. Welded or otherwise permanently secured to tube 34 is a collar 50. Extending between collar 50 and insulator 48 is a pair of Belleville washers 52 for purposes to be discussed below.

The tube 34 at its lower end ends in a screw-threaded portion 54 on which a nut 56 is screwed, the nut being effective to force the lower terminal 30 into contact with the respective end face of the cylinder 26. As the nut 56 is screwed tighter, it places in tension the portion of tube 34 extending between collar 50 and the nut. This tension is transferred as a compressive force to cylinder 26, and is also transmitted to the Belleville washers 52. The latter provide the necessary degree of resilience so that thermal movements of the various members of the heater 8 are accommodated while keeping the various contact resistances uniform at their necessarily low values. Alternatively, the lower terminal 30 can be permanently fixed to the lower end of tube 34, and the collar 50 can be screw-threaded to conduit 34 so as to provide convenient means for adjusting the degree of compression of the Belleville washers 52.

The tube 34 is perforated at intervals along its length with openings 58. Theses permit the oil passing along the interior of tube 34 to flow under pressure into the space 60 within the interior of the element 8. With this direction of flow of the oil, the inner cylindrical face 27 of the heater body 26 becomes an entry face for the liquid to be heat-treated, and the external cylindrical surface 31 becomes an exit face.

In accordance with the present invention, the entry face is lined with one or more layers of a permeable material of high electrical resistance, so that it carries no, or a virtually negligible, heating current. This layer or layers of material acts as a liner 62 for the entry face. A suitable material for the liner can be a thermally stable body of a suitably inert material such as fibrous alumina. The fibres can be woven or felted so that the liner presents a substantially uniform, and high, impedance to the flow of oil through it.

Because the oil in the interior of tube 34 is virtually at the delivery pressure of pump 42, and because the exit face of heater 8 is at the pressure applied by vacuum pump 20, it will be appreciated that a significant pressure gradient is established across the oil in flowing through the heater. In accordance with the present invention, the flow impedance of liner 62 is chosen so that under the dynamic pressure conditions prevailing in the heater in operation, the evolution of significant quantities of water vapour or gaseous impurities from the oil takes place only after the oil has passed through the entry face of the liner.

In order to ensure correct operation of the apparatus, it is important to ensure that heat is abstracted uniformly from the heater element. If the heat is removed at a lower rate from some parts of the element, these tend to overheat: this can damage both the element itself and the liquid being treated. To ensure uniform abstraction, it is necessary to arrange for there to be uniform mass flow of the fluid being treated, irrespective of whether it is in its liquid or its gaseous phase. It is for this reason that the release of sorbate or water vapour at the entry face of the liner is to be suppressed, for the resultant bubbles blanket parts of the entry face and lead to uneven mass flow.

In one example of degassing equipment of the present invention, using a single-stage apparatus such as is shown in FIG. 1, the liquid to be treated was a transformer oil which had become fully aerated and contaminated with above 300 parts per million (ppm) of water. It was required that the moisture content of the oil be reduced to below three ppm.

According to the rate at which liquid was caused to flow through the heater 8, the pressure of liquid on the entry face of liner 62 was between 2500 and 250 torr, at a temperature of about 25° C.

At a temperature of 25° C water boils when the pressure above the water is reduced to 20 torr. This means that the pressure gradients across the liner 62 and across the heater body 26 should desirably be such that the fluid pressure exceeds 20 torr until the exit face of the liner, i.e., the interface between the liner and the heater body 26, is nearly reached so that a significant quantity of water vapour bubbles is not evolved until the fluid has entered body 26. The evolution of water vapour is caused both by the resultant further drop in pressure to below 20 torr, as the pressure approaches the outlet pressure of about 1 torr, and the heating of the oil to its exit temperature of 60° C. These two factors combine to ensure that substantially all the water is vaporized from the oil during its passage through the heater, and while the heated oil is subjected to vacuum as it flows in thin films over the Raschig rings 9.

Because the pressure drop through the element body 26 was small compared with that across the liner, the pressure at the exit face of the liner was about 20 torr. This pressure drop was sufficient to ensure that the evolution of bubbles of degassed sorbate and water vapor was significant only after the liquid had entered body 26, and was virtually completely suppressed upstream of the entry face of the liner.

The amount of heat supplied to the element was controlled by the variable voltage source 33, so that the oil emerged at the exit face of heater body 26 at a temperature of about 60° C. With the different flow rates mentioned above, the average time for the liquid to traverse the thickness of body 26 varied from below one second to about five seconds. The resultant warmed and partially degassed oil flowed from the heater and fell on to the packed column fillers 9.

Figure 3:
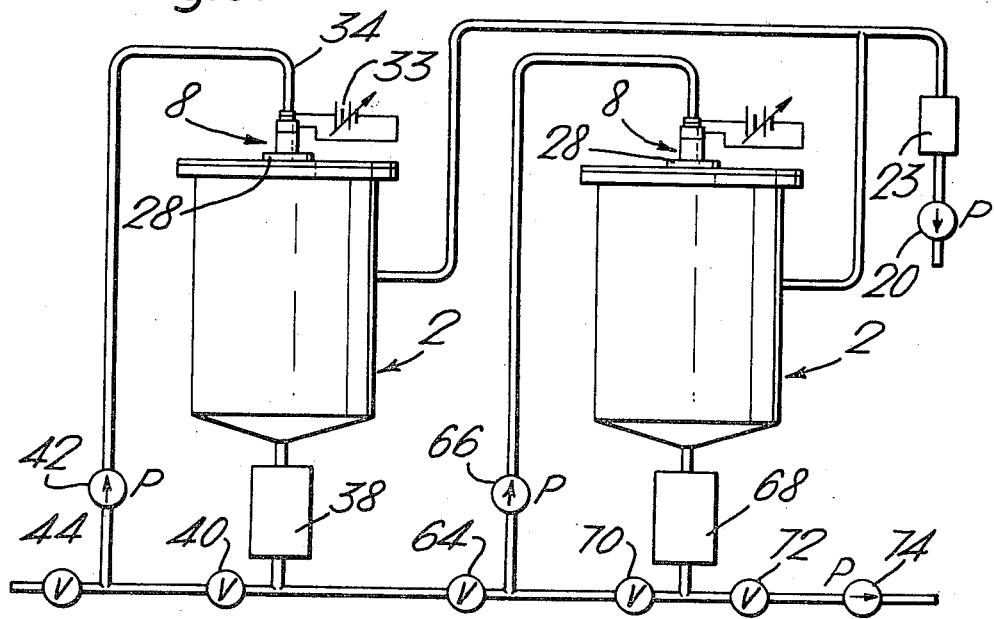
FIG. 3 is a diagrammatic view of a two-stage vacuum drying and degassing apparatus of the present invention.

It has been found that treating the liquid in one pass enabled the water content to be reduced from 300 ppm to about 3 ppm. In order to reduce the water content significantly below this level, to the desired level of less than 1 ppm, it was necessary to treat the liquid a second time. Although this could be effected by passing the liquid twice through the same apparatus, it is preferred to use the apparatus such as is shown in FIG. 3. In this apparatus, parts which are the same as shown in FIG. 1 have been given the same references.

Two similar degassing apparatuses such as are shown in FIG. 1 are connected as shown, with the reservoir 38 of the first apparatus being able to be placed in communication, through a valve 64, with the inlet of a second oil pump 66 arranged to supply the once-treated oil to the inlet of the second-stage. The second stage has a second reservoir 68 which is able to have its contents passed to the inlet of pump 66 by means of a valve 70, or to an outlet by means of a valve 72 and pump 74 to raise the pressure of the treated oil to that of the atmosphere. As can be seen from the drawing, both containers 2 are adapted to be evacuated by means of a condenser 23 and pump 20 common to both, but it would be within the purview of the present invention to use separate vacuum pumps, with or without condensers.

This would be useful to enable the second-stage apparatus to be subjected to a greater degree of vacuum to lower the water content of the finally-treated oil to below one ppm.

With electrical oils, it is the water content which is the primary contaminant, and so it is necessary only to monitor the water content to check the effective operation of the apparatus. It has been found that if the water content is reduced to an acceptable value, the process automatically removes any sorbed gases, without its being necessary to monitor the degree of gas contamination.

When the degassing equipment of the present invention is working as intended, it has been found that the use of a permeable element heater combined with a liner is so efficient that the use of packed column fillers is unnecessary. However, the chamber 6 would still be used, to act primarily as a setting tank for the spray ejected from the heater.

Although the apparatus of the present invention has been described in the context of treating electric insulation and dielectric oils, it could be used, with appropriate modification, for treating other liquids. One such important other use would be for treating edible oils to remove undesirable, odiferous, etc., volatile constituents.

I claim:

1. In a vacuum drying and degassing apparatus for contaminated normally dielectric liquids, including means for supplying contaminated liquid at a chosen rate and pressure to the inlet of a permeable element heater; means for passing electric heating current through the body of the heater at a rate chosen to release heat within the body at a desired rate; a vacuum chamber enclosing the permeable element heater and having two outlets at different levels; a vacuum pump connected to the upper one of said outlets and adapted to produce subatmospheric pressures within the chamber; means for withdrawing treated liquid from the lower one of said outlet; the permeable element heater having a body of high-permeability, electrically conductive, material having an entry face for cool liquid and an exit face for heated liquid and degassed sorbate and water vapour, in which the exit face is exposed to the pressure in the vacuum chamber, the improvement comprising a liner of low-permeability, electrically resistive or electrically insulating material at the entry face of the permeable element heater body; wherein the flow impedance of the liner maintains pressure gradients through the heater body wherein a subatmospheric pressure of greater than about 20 torr is maintained on the exit face of the liner whereby the evolution of degassed sorbate and water vapor from the liquid is inhibited until after the liquid has passed through the said entry face.

2. Vacuum drying and degassing apparatus as claimed in claim 1, in which:
the body of the permeable element heater is in the shape of a hollow cylinder;
the liquid supply means is in communication with the interior of the cylinder, and
the low-permeability liner is in contact with the inner entry face of the cylinder.

3. Vacuum drying and degassing apparatus as claimed in claim 1, in which the liquid-withdrawing means has an outlet connected to an inlet of the supply means, whereby treated liquid can be recycled through the apparatus.

4. In an apparatus for heating, drying and degassing a contaminated normally dielectric liquid under vacuum, including a vacuum-tight container having an inlet for liquid to be treated, and housing a permeable heater body of electroresistive material having an entry face and an exit face and through which liquid can be passed and by which the liquid is heated by the Joule effect, and packed column fillers over which the liquid issuing from the heater can flow in thin films, and having an outlet toward which the heated liquid flows, the container being adapted to be connected to a vacuum pump so that the interior of the container can be subjected to a desired degree of vacuum, the improvement comprising means for precluding the formation of a gas or vapor blanket on the entry face of the permeable heater body wherein spots on or within the heater body sufficiently hot to effect thermal degradation of the liquid being treated are precluded whereby the normally dielectric property of the liquid is maintained.

5. Liquid treatment apparatus as claimed in claim 4, in which the heater body is in the form of a hollow cylinder.

6. Liquid treatment apparatus as claimed in claim 5, in which an annular terminal for connection to a source of electricity is located at each end of the heater body.

7. Liquid treatment apparatus as claimed in claim 5, in which the inlet is in communication with the interior of the heater body.

8. Liquid treatment apparatus claimed in claim 4, in which the portion of the container housing the heater body is separated from the column fillers by a perforated partition.

9. Liquid treatment apparatus as claimed in claim 8, in which the outlet is separated from the column fillers by a second perforated partition.

10. Liquid treatment apparatus as claimed in claim 9, in which the column fillers are contained in a compartment having perforated walls, the perforated walls being spaced apart from the walls of the container.

11. Liquid treatment apparatus as claimed in claim 10, in which the compartment and the container are generally cylindrical in shape and there is an annular space between the curved wall of the compartment and the curved wall of the container.

12. Liquid treatment apparatus as claimed in claim 4, in which the surfaces of the column fillers are chemically inert.

13. Liquid treatment apparatus as claimed in claim 12, in which the column fillers are in the form of Raschig rings.

14. Liquid treatment apparatus as claimed in claim 4, in which a filter is located within the container.

15. Liquid treatment apparatus as claimed in claim 4, in which the heater body is made of carbon.

16. Liquid treatment apparatus as claimed in claim 4, in which the heater body is made of barium titanate.

17. Liquid treatment apparatus as claimed in claim 4 wherein said means for precluding the formation of a gas or vapor blanket on the entry face of the permeable heater body comprises a liner of low-permeability and said vacuum is greater than about 20 torr at about 25° C.

* * * * *